(12) United States Patent
Jeon et al.

(10) Patent No.: US 11,917,466 B2
(45) Date of Patent: Feb. 27, 2024

(54) HANDOVER RELIABILITY ENHANCEMENT IN WIRELESS COMMUNICATION

(71) Applicant: Samsung Electronics Co., Ltd., Suwon-si (KR)

(72) Inventors: Jeongho Jeon, San Jose, CA (US); Kyeongin Jeong, Allen, TX (US); Joonyoung Cho, Portland, OR (US); Andrew Park, London (GB); Eunsun Kim, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 17/450,550

(22) Filed: Oct. 11, 2021

(65) Prior Publication Data

US 2022/0124580 A1 Apr. 21, 2022

Related U.S. Application Data

(60) Provisional application No. 63/158,178, filed on Mar. 8, 2021, provisional application No. 63/092,777, filed on Oct. 16, 2020.

(51) Int. Cl.
*H04W 36/32* (2009.01)
*H04W 36/00* (2009.01)

(52) U.S. Cl.
CPC . *H04W 36/00837* (2018.08); *H04W 36/0072* (2013.01); *H04W 36/0088* (2013.01); *H04W 36/32* (2013.01)

(58) Field of Classification Search
None
See application file for complete search history.

(56) References Cited

U.S. PATENT DOCUMENTS

| | | | | |
|---|---|---|---|---|
| 2013/0122914 | A1* | 5/2013 | Fukuta | H04W 64/003 455/456.2 |
| 2019/0223073 | A1 | 7/2019 | Chen et al. | |
| 2020/0314914 | A1 | 10/2020 | Roy et al. | |
| 2020/0314947 | A1* | 10/2020 | Latheef | H04W 76/38 |

(Continued)

FOREIGN PATENT DOCUMENTS

CN 111567093 A 8/2020

OTHER PUBLICATIONS

"3rd Generation Partnership Project; Technical Specification Group Radio Access Network; Study on New Radio (NR) to support non-terrestrial networks, (Release 15)", 3GPP TR 38.811 V15.4.0, Sep. 2020, 127 pages.

(Continued)

*Primary Examiner* — Kodzovi Acolatse

(57) ABSTRACT

A method for user equipment (UE) service handover from the serving cell to a target cell includes information regarding a handover timer and an associated handover execution condition. For scheduled handover to be performed upon expiration of the handover timer, the associated handover execution condition comprises one or more abort conditions for aborting the scheduled handover. For two-stage triggered handover to be performed upon receipt of a subsequent triggering message, the handover timer is a handover validity timer and the associated handover execution condition comprises receipt of the handover triggering message prior to expiration of the handover validity timer.

20 Claims, 7 Drawing Sheets

(56) References Cited

U.S. PATENT DOCUMENTS

| | | | |
|---|---|---|---|
| 2021/0058836 A1* | 2/2021 | Kimba Dit Adamou | ................... H04W 36/0058 |
| 2021/0084559 A1* | 3/2021 | Chaponniere | ......... H04W 36/32 |
| 2021/0321313 A1* | 10/2021 | Yan | ................... H04W 36/0083 |
| 2021/0410034 A1* | 12/2021 | You | ................... H04W 74/0833 |
| 2022/0030483 A1* | 1/2022 | Cheng | ................... H04W 76/30 |
| 2022/0217598 A1* | 7/2022 | Ishii | ................... H04W 36/305 |
| 2022/0240139 A1* | 7/2022 | Park | ...................... H04W 36/36 |
| 2022/0377625 A1* | 11/2022 | Li | ...................... H04W 36/0058 |
| 2022/0394563 A1* | 12/2022 | Wu | ................... H04W 36/0061 |
| 2023/0164648 A1* | 5/2023 | Wang | ................ H04W 36/0072 370/331 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.1.0, May 2021, 140 pages.

"Solutions for NR to support non-terrestrial networks (NTN)", 3GPP TSG RAN meeting #86, RP-193234, Sitges, Spain, Dec. 9-13, 2019, 10 pages.

"New Study WID on NB-IoT/eTMC support for NTN", 3GPP TSG RAN meeting #86, RP-193235, Sitges, Spain, Dec. 9-31, 2019, 4 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Physical layer procedures for data (Release 16)", 3GPP TS 38.214 V16.6.0, Jun. 2021, 172 pages.

International Search Report and Written Opinion dated Jan. 21, 2022 regarding International Application No. PCT/KR2021/014330, 7 pages.

Lenovo et al., "Mobility Management in NTN", 3GPP TSG-RAN WG2 Meeting #111 electronic, R2-2007463, Aug. 2020, 4 pages.

Ericsson, "On Validity Timer for Conditional Handover in LTE", 3GPP TSG RAN WG2 #106, R2-1906201 (Revision of R2-1903890), May 2019, 9 pages.

Sony, "Mobility Management in NTN", 3GPP TSG-RAN WG2 Meeting #111 electronic, R2-2007183, Aug. 2020, 3 pages.

* cited by examiner

HANDOVER RELIABILITY ENHANCEMENT IN WIRELESS COMMUNICATION

CROSS-REFERENCE TO RELATED APPLICATION AND CLAIM OF PRIORITY

This application claims priority under 35 U.S.C. § 119(e) to U.S. Provisional Patent Application No. 63/092,777 filed Oct. 16, 2020 and U.S. Provisional Patent Application No. 63/158,178 filed Mar. 8, 2021. The above-identified patent document(s) are incorporated herein by reference.

TECHNICAL FIELD

The present disclosure relates generally to handover reliability enhancement, and more specifically to scheduled handover and two-stage triggered handover.

BACKGROUND

To meet the demand for wireless data traffic having increased since deployment of 4$^{th}$ Generation (4G) or Long Term Evolution (LTE) communication systems and to enable various vertical applications, efforts have been made to develop and deploy an improved 5$^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and technologies associated therewith is for reference as certain embodiments of the present disclosure may be implemented in 5G systems, 6$^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

A method for user equipment (UE) service handover from the serving cell to a target cell includes information regarding a handover timer and an associated handover execution condition. For scheduled handover to be performed upon expiration of the handover timer, the associated handover execution condition comprises one or more abort conditions for aborting the scheduled handover. For two-stage triggered handover to be performed upon receipt of a subsequent triggering message, the handover timer is a handover validity timer and the associated handover execution condition comprises receipt of the handover triggering message prior to expiration of the handover validity timer.

In one embodiment, a serving cell includes a processor configured to generate a message for handover of service for a user equipment (UE) from the serving cell to a target cell, the message including information regarding a handover timer having an associated handover execution condition. In case the handover timer is a scheduled handover timer for a scheduled handover to be performed for the UE upon expiration of the scheduled handover timer, the associated handover execution condition comprises one or more abort conditions for aborting the scheduled handover. In case the handover timer is a handover validity timer for a predicted handover to be performed based on receipt at the UE of a handover triggering message, the associated handover execution condition comprises receipt of the handover triggering message prior to expiration of the handover validity timer. The serving cell includes a transceiver operatively coupled to the processor and configured to transmit, to the UE, the message for the handover of service, and receive a handover completion acknowledgement based on completion of handover of the service for the UE from the serving cell to the target cell.

In a second embodiment, a method comprises transmitting a message for handover of service for a user equipment (UE) from the serving cell to a target cell, the message including information regarding a handover timer having an associated handover execution condition. In case the handover timer is a scheduled handover timer for a scheduled handover to be performed for the UE upon expiration of the scheduled handover timer, the associated handover execution condition comprises one or more abort conditions for aborting the scheduled handover. In case the handover timer is a handover validity timer for a predicted handover to be performed based on receipt at the UE of a handover triggering message, the associated handover execution condition comprises receipt of the handover triggering message prior to expiration of the handover validity timer. The method further comprises receiving a handover completion acknowledgement based on completion of handover of the service for the UE from the serving cell to the target cell.

In any of the embodiments, the serving cell may be configured to transmit a handover execution cancelation message before expiration of the handover timer. The handover execution cancelation message may include an index of the handover timer among one or more configured handover timers.

In any of the embodiments, the one or more abort conditions may comprise at least one of a radio resource management (RRM) event, or a location of the UE. The RRM event may comprise at least one of a measurement for the serving cell being better than a first threshold value upon expiration of the scheduled handover timer, a measurement for a third cell being better, upon expiration of the scheduled handover timer, than one or more of the measurement for the serving cell, a measurement for the target cell, or a second threshold value, and the measurement for the target cell being less than a third threshold value upon expiration of the scheduled handover timer. The location of the UE may comprise a location-based abort condition comprising a measurement of UE location deviation from a location at which the UE was activated with the handover timer.

In any of the embodiments, in case the handover timer is a handover validity timer, the associated handover execution condition may further comprise the one or more abort conditions for aborting the predicted handover, and the handover triggering message may include an index of the handover timer among one or more configured handover timers.

In any of the embodiments, the serving cell preferably configures the handover validity timer based on one or more of a location of the UE, a location of a transmission reception point (TRP), a trajectory of the UE, or a trajectory of the TRP.

In any of the embodiments, in case the handover timer is a handover validity timer, the transceiver is further configured to transmit a group triggering message to one or multiple UEs, and the group triggering message may be scrambled with Radio Network Temporary Identifier (RNTI) known for a group of UEs, and the group triggering message includes one or more of UE identifications triggered for handover among the UEs in the group of UEs.

In another embodiment, a UE includes a transceiver configured to receive, from a serving cell, a message for handover of service for the UE from the serving cell to a target cell, the message including information regarding a handover timer having an associated handover execution condition. In case the handover timer is a scheduled handover timer for a scheduled handover to be performed for the UE upon expiration of the scheduled handover timer, the associated handover execution condition comprises one or more abort conditions for aborting the scheduled handover. In case the handover timer is a handover validity timer for a predicted handover to be performed based on receipt at the UE of a handover triggering message, the associated handover execution condition comprises receipt of the handover triggering message prior to expiration of the handover validity timer. The user equipment also includes a processor operatively coupled to the transceiver and configured to initiate the handover timer in response to receiving the message for the handover of service for the UE. The transceiver is configured to transmit a handover completion acknowledgement based on completion of handover of the service for the UE from the serving cell to the target cell.

The UE may be configured to receive a handover execution cancelation message before expiration of the handover timer. The handover execution cancelation message may include an index of the handover timer among one or more configured handover timers.

The one or more abort conditions may comprise at least one of a radio resource management (RRM) event, or a location of the UE. The RRM event may comprise at least one of a measurement for the serving cell being better than a first threshold value upon expiration of the scheduled handover timer, a measurement for a third cell being better, upon expiration of the scheduled handover timer, than one or more of the measurement for the serving cell, a measurement for the target cell, or a second threshold value, and the measurement for the target cell being less than a third threshold value upon expiration of the scheduled handover timer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
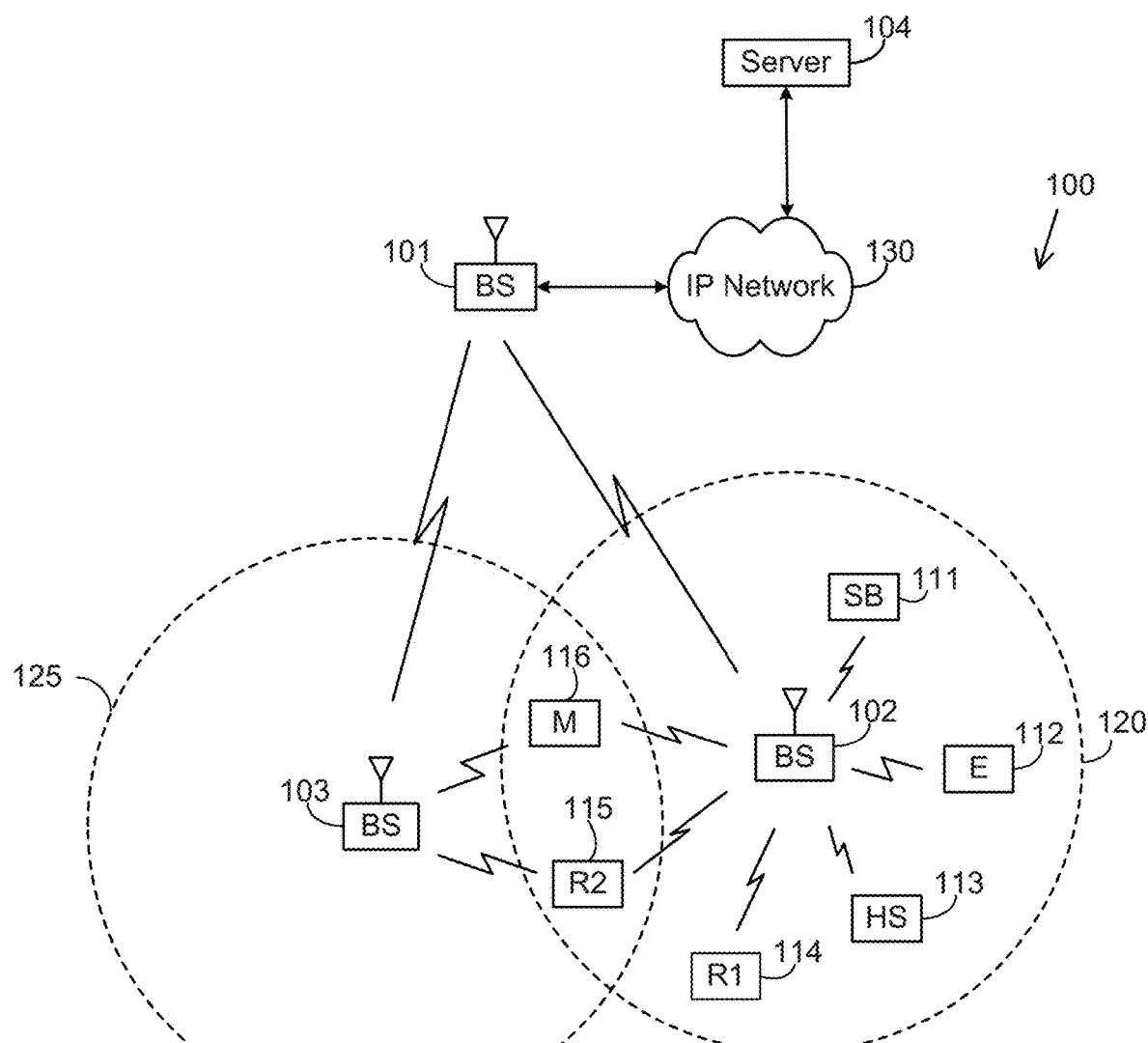
FIG. 1 illustrates an exemplary networked system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

References

[1] 3GPP, TR 38.811, Study on NR to support non-terrestrial networks.
[2] 3GPP, TR 38.821, Solutions for NR to support non-terrestrial networks (NTN).
[3] RP-193234, Solutions for NR to support non-terrestrial networks (NTN), Thales, RAN #86, December 2019.
[4] RP-193235, New study WID on NB-IoT/eMTC support for NTN, MediaTek Inc., RAN #86, December 2019.
[5] 3GPP, TS 38.331, 5G; NR; Radio Resource Control (RRC); Protocol specification.
[6] 3GPP, TS 38.214, 5G; NR; Physical layer procedures for data.

The above-identified references are incorporated herein by reference.

Abbreviations

NTN non-terrestrial networks
BS Base Station
UE User Equipment
NR New Radio
3GPP 3rd Generation Partnership Project
WI Work Item
SI Study Item
LEO Low Earth Orbiting
MEO Medium Earth Orbiting
GEO Geostationary Earth Orbiting
TBS Transport Block Size
MCS Modulation and Coding Scheme
SIB System Information Block
DCI Downlink Control Information
PDCCH Physical Downlink Control Channel
PDSCH Physical Downlink Shared Channel
PUSCH Physical Uplink Shared Channel
RRC Radio Resource Control
MSB Most Significant Bits
LSB Least Significant Bits
DL Downlink
UL Uplink
NB-IoT Narrowband Internet of Things
eMTC Enhanced Machine Type Communication
LTE Long-Term Evolution
PRB Physical Resource Block
RV Redundancy Version
mTRP Multiple Transmission and Reception Point
PCI Physical Cell ID
CORESET Control Resource Set
BWP Bandwidth Part This subject matter of this disclosure can be generally applied to wireless communication systems to improve handover reliability. The enhancement of handover reliability becomes especially more important for scenarios where the need for handover arises frequently or the execution of handover is prone to fail due to weak link condition. Examples of such scenarios include but are not limited to non-terrestrial network (NTN) and high-speed train use, etc.

NTN refers to the networks, or segments of networks, using an airborne or space-borne vehicle to embark a transmission equipment relay node or base station [38.811]. NTN can provide ubiquitous coverage and is less vulnerable to disasters, compared to conventional terrestrial network. There is increasing interest in support of NTN in NB-IoT, eMTC, LTE and 5G systems. 3GPP has completed a study in Rel-15 on NTN deployment scenarios, channel models and potential impact areas on NR to support NTN [38.811]. Based on the outcomes of the TR [38.811], 3GPP further conducted a study in Rel-16 on a set of necessary features/adaptations to support NTN in NR [38.821]. In Rel-17, a WI for NTN in NR [RP-193234] and a SI for NB-IoT/eMTC support for NTN [RP-193235] have been approved.

Minimizing the occurrence of handover (HO) failures is important to improve the communication link reliability. For the case of handover failure, the UE needs to perform contention-based random access (CBRA) and, the communication link is disconnected in the meantime. With such motivation, NR mobility enhancement WI [RP-181433] defined mechanisms such as conditional handover (CHO) to reduce the HO failure events.

In the case of CHO, the network sends the HO command to a UE before the UE reaches cell edge area. As the HO command is sent while the channel condition between the serving cell and the UE is relatively good, the HO command reception failure itself can be reduced. On the other hand, the condition to execute HO is based on the existing radio resource management (RRM) measurement report events expressed in terms of the RRM metrics such as reference signal received power (RSRP), reference signal received quality (RSRQ), and signal to interference plus noise ratio (SINR). In the case of normal HO, a UE sends RRM measurement report to serving cell when a RRM measurement report event occurs. The serving cell will then command the UE to perform HO by sending RRC reconfiguration message in response to the measurement report.

In the case of NTN, the measured RRM metric between the serving cell and a target cell to perform HO may not be apparently distinguishable as the airborne transmission reception points (TRPs), such as satellites, are far away from the ground. Therefore, the conventional HO solutions based on RRM metric, including CHO, may need to be improved for NTN. On the other hand, for the cases when the UE or TRP's moving trajectory is predictable, e.g., satellites movement following the predetermined orbit or high-speed train following the railway, a new mechanism of performing HO based on location may be possible. For the cases of above-mentioned example scenarios, the occurrence of HO can be frequent and time-correlated between UEs. Therefore, the need of sending RRC reconfiguration message can be concentrated at a certain time, which can be a burden to network. Therefore, a method to distribute the load in sending RRC reconfiguration messages to UEs can be considered as well.

The present disclosure describes techniques, apparatuses and methods, which may be applied to wireless communication systems, supporting the execution of scheduled UE handover based on a timer and/or a two-stage triggered handover. Abort mechanism for the timer-based scheduled handover and group signaling for triggering two-stage triggered handover are disclosed. The disclosed designs below can be applied not only to NTN or high-speed train use, but also to any general scenario in wireless communications. The examples for NTN or high-speed train use should be considered in inclusive manner, without exclusion of other use cases in wireless communications or wireless communication systems. For example, the disclosed methods can be applied to both LTE and NR, or any future or existing communication systems.

FIG. 1 illustrates an exemplary networked system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), subscriber station" (or "SS"), "remote terminal," "wireless terminal," or "user device."

For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
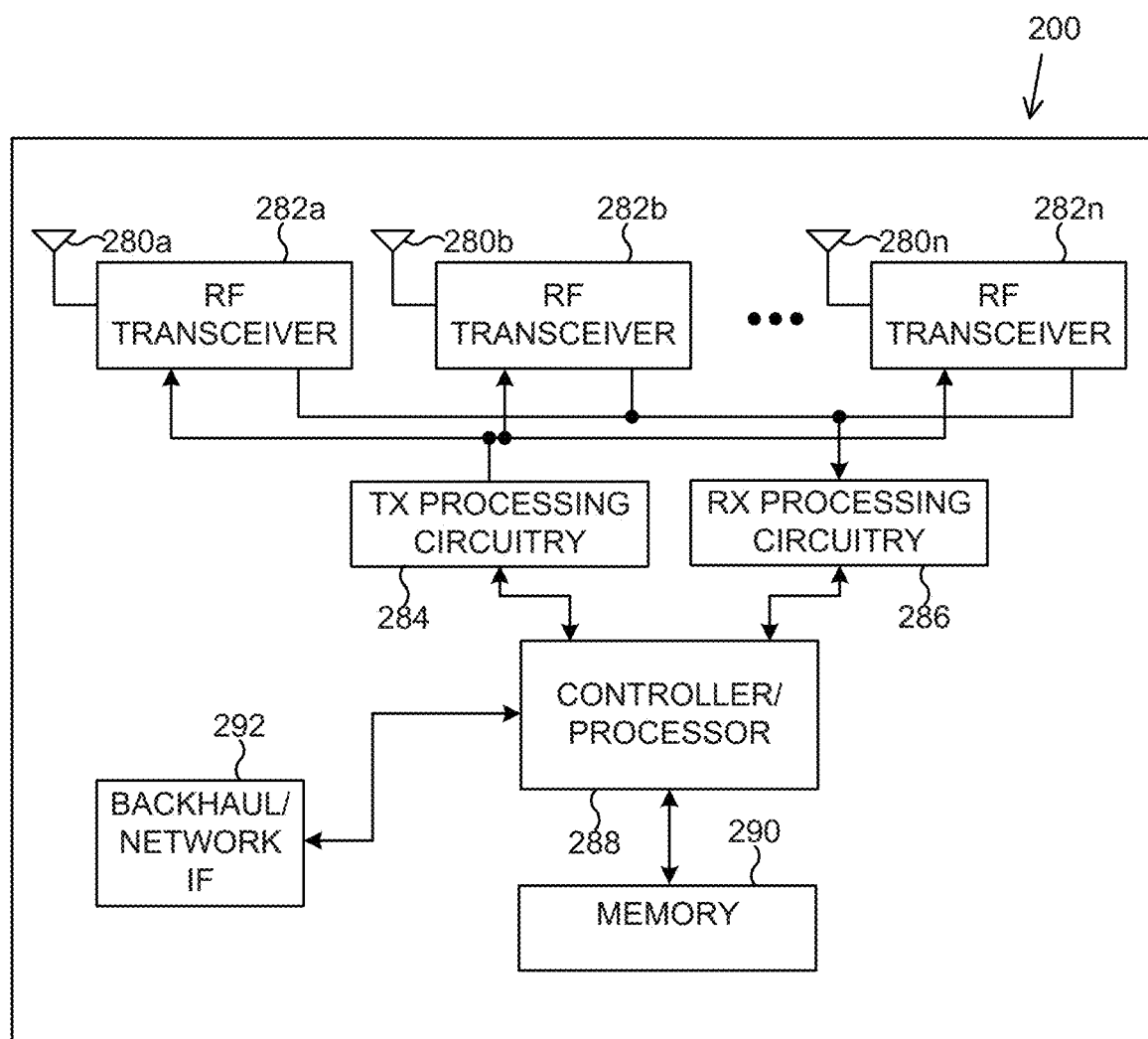
FIG. 2 illustrates an exemplary base station (BS) according to various embodiments of this disclosure.

FIG. 2 illustrates an exemplary base station (BS) according to various embodiments of this disclosure. The embodiment of the BS 200 illustrated in FIG. 2 is for illustration only, and the BSs 101, 102 and/or 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280a-280n, multiple radio frequency (RF) transceivers 282a-282n, transmit (TX or Tx) processing circuitry 284, and receive (RX or Rx) processing circuitry 286. The BS 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282*a*-282*n*, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280*a*-280*n* are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 100 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a random access memory (RAM), and another part of the memory 290 could include a Flash memory or other read only memory (ROM).

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit signals to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 102 could include multiple instances of each (such as one per RF transceiver). Also, various components in FIG. 2 could be combined, further subdivided, or omitted and additional components could be added according to particular needs.

Figure 3:
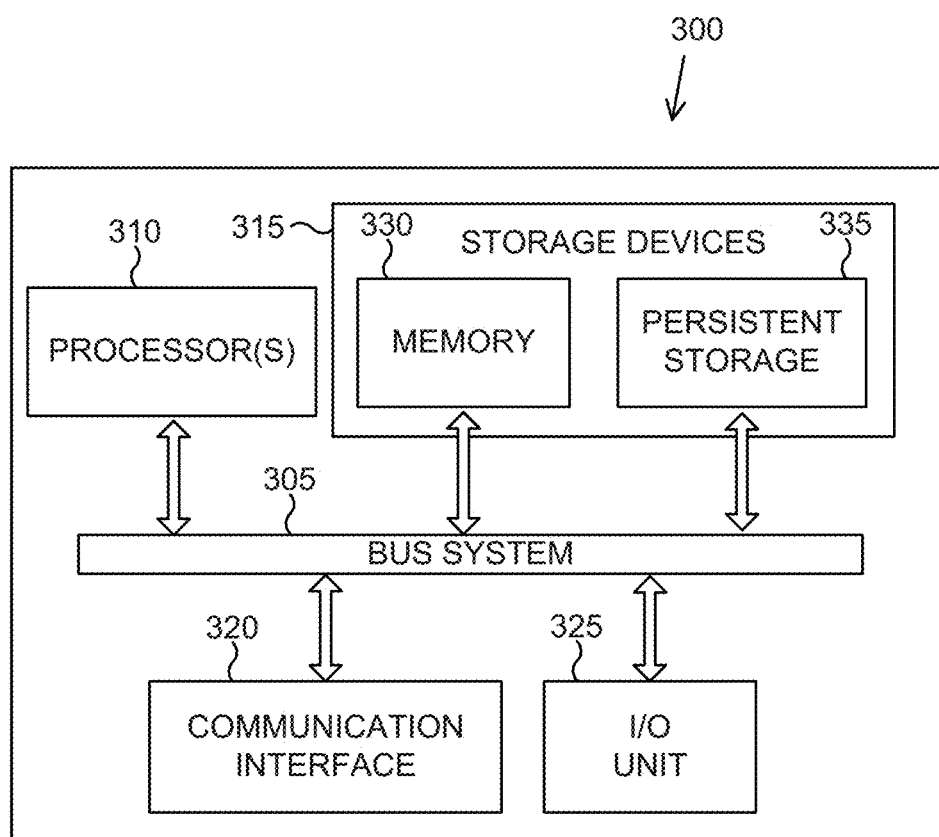
FIG. 3 illustrates an exemplary electronic device for communicating in the networked computing system according to various embodiments of this disclosure.

FIG. 3 illustrates an exemplary electronic device for communicating in the networked computing system according to various embodiments of this disclosure. In one embodiment, the electronic device 300 is a user equipment implemented as a mobile device, which can represent one of the UEs 111, 112, 113, 114, 115 or 116 in FIG. 1. However, UEs come in a wide variety of configurations, and FIG. 3 does not limit the scope of this disclosure to any particular implementation of a UE.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discrete circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a wireless system including a plurality of such electronics devices, such as UEs 111, 112, 113, 114, 115 or 116 in FIG. 1, various changes may be made to FIG. 3. For example, various components in FIG. 3 can be combined, further subdivided, or omitted and additional components could be added according to particular needs. In addition, as with computing and communication networks, electronic devices can come in a wide variety of configurations, and FIG. 3 does not limit this disclosure to any particular electronic device.

Figure 4:
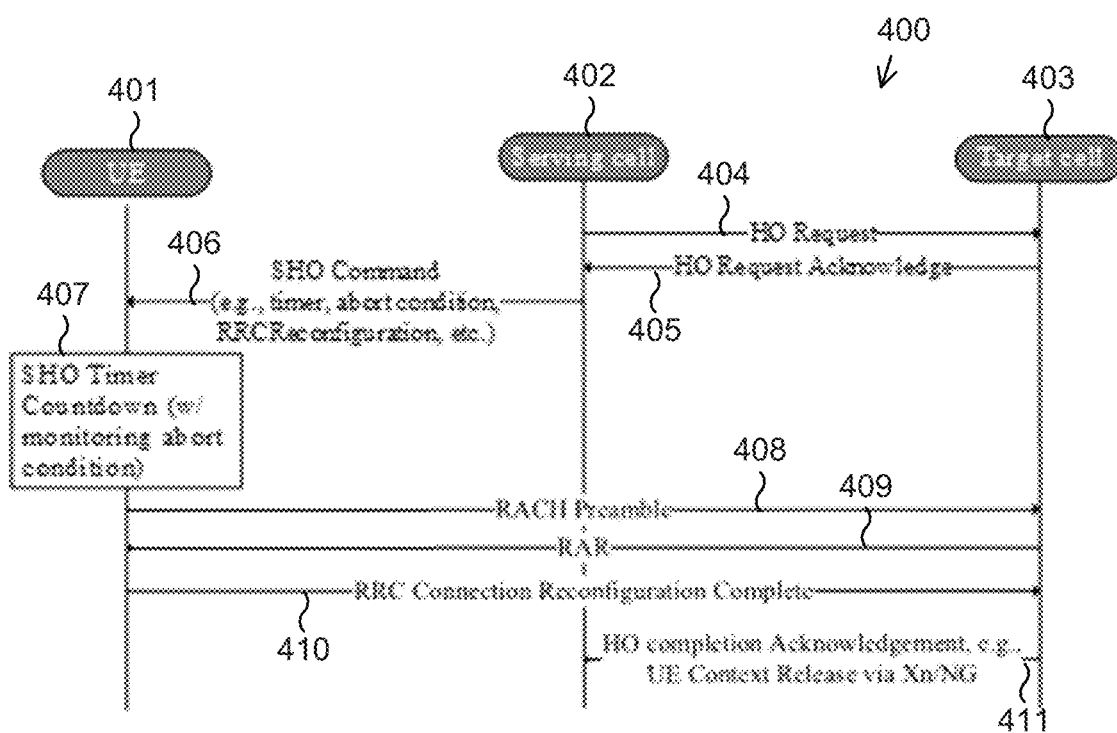
FIG. 4 illustrates an exemplary signal exchange for SHO between a UE, serving cell, and target cell according to embodiments of the present disclosure.

FIG. 4 illustrates an exemplary signal exchange for SHO between a UE, serving cell, and target cell according to embodiments of the present disclosure. The UE 401 may be any of UEs 111, 112, 113, 114, 115 or 116 in FIG. 1 and may have the structure of the electronic device 300 in FIG. 3. Serving cell 402 may be one of BSs 101, 102 or 103 in FIG. 1 and may have the structure of BS 200 illustrated in FIG. 2. Target cell 403 may be another of BSs 101, 102 or 103 in FIG. 1 and may also have the structure of BS 200 illustrated in FIG. 2. The embodiment of FIG. 4 is for illustration only.

Other embodiments of the process 400 could be used without departing from the scope of this disclosure.

FIG. 4 depicts the concept of SHO through signal exchanges between UE 401, serving cell 402, and target cell 403. In SHO, the serving cell 402 can send HO request 404 to a target cell 403 based on the prediction on the future need of performing HO based on the location and/or trajectory of TRPs and/or UEs, including UE 401. When sending the HO request 404, the serving cell 402 can optionally inform the target cell 403 that the requested HO is SHO type. The scheduling information on when the SHO will be actually executed can be additionally informed.

After receiving HO Request Acknowledgement 405 from target cell 403, the serving cell 402 sends SHO Command 406 to UE 401 including but not limited to timer, abort condition, and RRC reconfiguration message. The timer indicates when to execute the HO after receiving the SHO command 406. The serving cell 402 can configure the timer value based on the prediction on when the HO needs to be performed using information including but not limited to the location and/or trajectory of TRPs and/or UEs, including UE 401. A default timer value can be assumed by UE 401 if the timer is not explicitly configured. For the situation when multiple UEs need to perform HO at the same time, the serving cell 402 can distribute the load of sending HO commands 406 in time by sending the SHO Commands to UEs with a time gap by configuring different timer values.

After receiving SHO Command 406, the UE 401 holds the execution of HO during the specified value for the timer 407. When the time comes to perform HO, the UE 401 executes HO using the previously received RRC reconfiguration message as a part of SHO Command 406. For example, UE 401 may transmit a random access channel (RACH) preamble 408 to target cell 403 and receive a random access response RAR) 409 in response. The UE 401 may transmit an RRC Connection Reconfiguration Complete 410 to the target cell 403, and the target cell 403 may transmit a HO completion acknowledgement 411 to the serving cell 402. If one or more abort condition(s) is configured with the SHO, the UE 401 monitors the occurrence of such abort condition(s) while counting down the timer 407. In some embodiments, the instance or timing to evaluate the abort condition can be explicitly configured to the UE 401.

Various kinds of abort conditions can be configured. As one embodiment, any radio resource management (RRM) measurement report events already defined in NR or to be defined in NR can be used. For example, in the case of A1 event, the execution of the SHO can be aborted if the serving cell 402 becomes better than threshold at the expiration of the timer. As another example, in the case of A3-A6 events, if another cell other than the target cell 403 configured in the SHO becomes better than the serving cell 402, better than the configured target cell 403, or better than a certain configured threshold, the UE 401 can abort the execution of the SHO and may send the RRM measurement report to serving cell 402. As yet another example, if the target cell 403 does not satisfy configured A3-A6 events at the time of HO execution, the UE 401 can abort the execution of the SHO and may send the RRM measurement report to serving cell 402. In another embodiment, the abort condition can be based on UE location. For instance, if the location of the UE 401 deviates more than a certain threshold from the location at which the UE 401 received the SHO Command 406, the UE 401 can freeze counting down the timer 407 and can inform the serving cell 402 together with updated location information. As another example, for the case when the UE 401 has location information of TRPs, the UE 401 can abort execution of HO and inform the serving cell 401, if the location of the UE 401 at the time of HO execution deviates more than a certain threshold from the target cell 403 or the location of the UE 401 at the time of HO execution is in proximity of another cell other than the target cell 403 by certain threshold.

In one embodiment, the serving cell 402 can send an HO cancelation message (not shown) to the previously sent SHO Command 406. When more than one SHO Command 406 is or has been sent to the UE 401, the serving cell 402 can indicate a specific SHO Command ID in the cancelation message.

If no abort event occurs prior to the completion of countdown for the timer 407, the UE 401 executes HO according to the RRC reconfiguration message contained in the SHO Command 406, which includes the PRACH transmission 408, RAR reception 409, and the transmission 410 of the RRC Connection Reconfiguration Complete as in the conventional HO.

Figure 5:
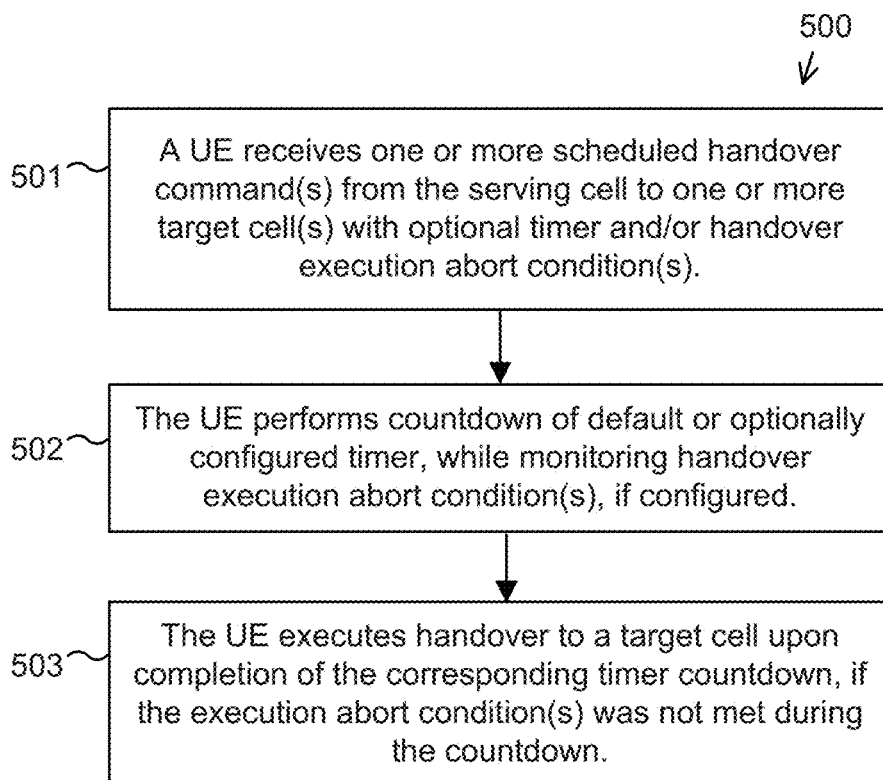
FIG. 5 illustrates a high level flowchart from a UE perspective illustrating SHO according to various embodiments of this disclosure.

FIG. 5 illustrates a high level flowchart from a UE perspective illustrating SHO according to various embodiments of this disclosure. The embodiment of FIG. 5 is for illustration only. Other embodiments of the process 500 could be used without departing from the scope of this disclosure.

FIG. 5 illustrates UE performance of SHO as depicted in FIG. 4. In the process 500, the UE receives one or more SHO Command(s) from the serving cell at operation 501. As previously described, the SHO Command(s) can include timer information, abort condition(s), and an RRC reconfiguration message. The serving cell can configure a series of SHOs to a sequence of target cells based on the location and/or trajectory of TRPs and/or UEs. In this case, each SHO Command may be configured with different timer values. When more than one SHO Command has identical handover execution time, or similar by certain amount of time, those SHO Commands can be considered invalid and the UE may not perform HO, may consider valid and perform HO to one of target cells having the best RRM metric, or may inform the serving cell of the timing collision. At operation 502, the UE counts down the timer while monitoring the occurrence of abort condition(s). If no abort event occurs until the completion of timer countdown, the UE executes HO at operation 503.

Figure 6:
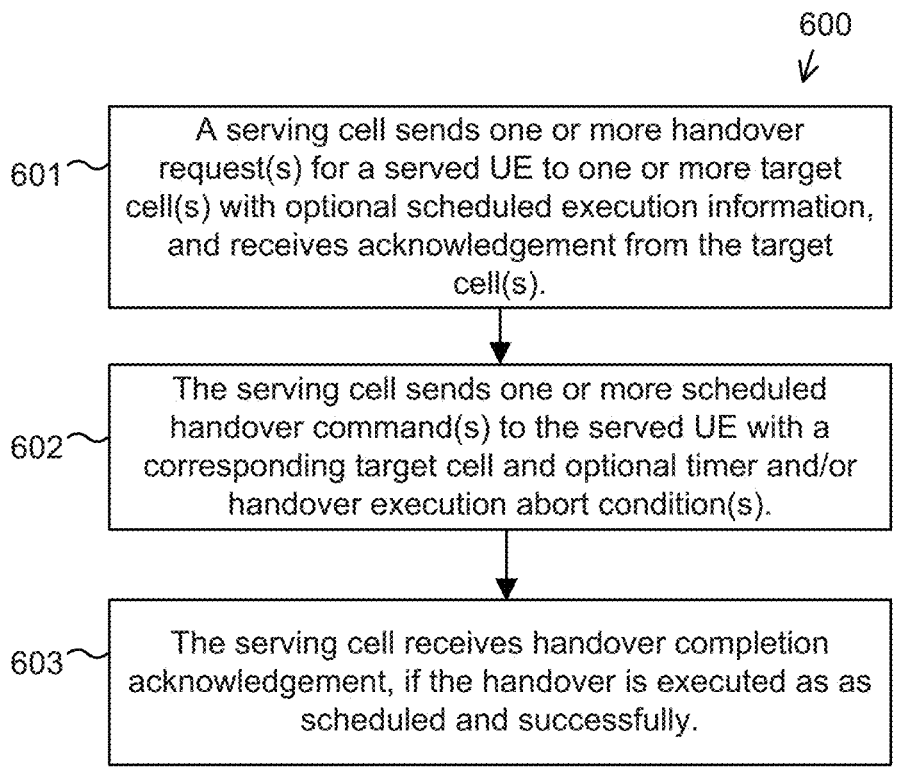
FIG. 6 illustrates a high level flowchart from a BS perspective illustrating SHO according to various embodiments of this disclosure.

FIG. 6 illustrates a high level flowchart from a BS perspective illustrating SHO according to various embodiments of this disclosure. The embodiment of FIG. 6 is for illustration only. Other embodiments of the process 600 could be used without departing from the scope of this disclosure.

FIG. 6 illustrates BS performance of SHO as depicted in FIG. 4. In the process 600, the serving cell sends an HO request to a target cell for a particular UE to perform HO at operation 601. When sending the HO request, the serving cell can optionally inform the target cell that the requested HO is SHO type along with the scheduling information on when the SHO will be executed. As described for method 500, when the serving cell intends to send more than one SHO Commands to a UE, the serving cell needs to send more than one HO request to target cells. After receiving an HO Request Acknowledgement from target cell, the serving cell confirms the target cell to be indicated to UE in the HO Command. At operation 602, the serving cell sends one or more of SHO Commands to UE with optional configuration on the timer and abort condition(s). When the SHO is successfully executed at operation 603, the serving cell receives HO completion acknowledgement, such as UE Context Release message, from the target cell.

An exemplary SHO RRC message design (e.g., a SchedReconfigToAddModList information element) is presented in Abstract Syntax Notation One (ASN.1) below:

```
-- ASN1START
-- TAG-SCHEDRECONFIGTOADDMODLIST-START
SchedReconfigToAddModList ::=    SEQUENCE (SIZE (1..
    maxNrofSchedCells)) OF SchedReconfigToAddMod
SchedReconfigToAddMod ::=        SEQUENCE {
    schedReconfigId                  SchedReconfigId,
    schedTimer                       ENUMERATED {ms_A, ms_B, ms_C, ...}
         OPTIONAL,   -- Cond
SchedReconfigAdd
    abortCond                        SEQUENCE (SIZE (1..N)) OF
      EventId                           OPTIONAL,     -- Cond
      schedReconfigAdd
    schedRRCReconfig                 OCTET STRING (CONTAINING
      RRCReconfiguration)               OPTIONAL,     -- Cond
schedReconfigAdd
    ...
}
-- TAG-SCHEDRECONFIGTOADDMODLIST-STOP
-- ASN1STOP
```

SchedReconfigToAddMod field descriptions:

schedTimer: Indicates the timer value until the execution of the scheduled handover. Value ms_N corresponds to N millisecond. [Note: the message can be designed to be in the unit of seconds or minutes.]

abortCond: The abort condition to abort the execution of scheduled handover if the condition is fulfilled. The EventId can be MeasId of configured measObject or refer to new location-based events defined for NTN.

SchedRRCReconfig: The RRCReconfiguration message to be applied when the scheduled handover is executed. The RRCReconfiguration message contained in schedRRCReconfig cannot contain the field scheduledReconfiguration.

With the example RRC message to configure SHO to UE, as described earlier, the UE can be configured with: a timer value on when to execute HO, denoted by schedTimer; HO abort conditions, denoted by abortCond; and the RRC Reconfiguration message for the HO execution indicated by SchedRRCReconfig. In the above example, schedTimer is expressed in the unit of ms. In the actual message design, the unit can be arbitrary, e.g., seconds or minutes, etc. If RRM measurement report events are used for abortCond, the configured measurement ID, denoted by MeasId, can be indicated. If location based abort conditions are newly defined, these new events can be configured using abortCond as well. When the serving cell sends HO cancelation message, the cancelation message can include schedReconfigId as the SHO Command ID.

The above listed abort conditions can be applied to cancel the execution of CHO. As an example, a UE is configured with RRM measurement events as a condition to perform handover. In addition, the UE can be configured with one or multiple of the above listed abort conditions. If the abort condition is met, then the UE aborts the execution of the configured CHO and can, optionally, indicate the network on the reasons why the handover execution was aborted. Also, the above listed conditions can be used, in an opposite manner, to execute the CHO as additional conditions. For instance, a location-based condition is set to a UE as a condition to trigger the handover execution.

One embodiment relates to operation of multi-value Doppler pre-compensation in a LEO satellite system, although the operation may also be applied to other wireless communication systems such as for communicating with UEs in high-speed train. It should not be interpreted as a limiting factor of the scope of this disclosure. This embodiment of multi-value Doppler pre-compensation in the LEO satellite system includes operations for downlink data reception for UEs in a connected state.

Figure 7:
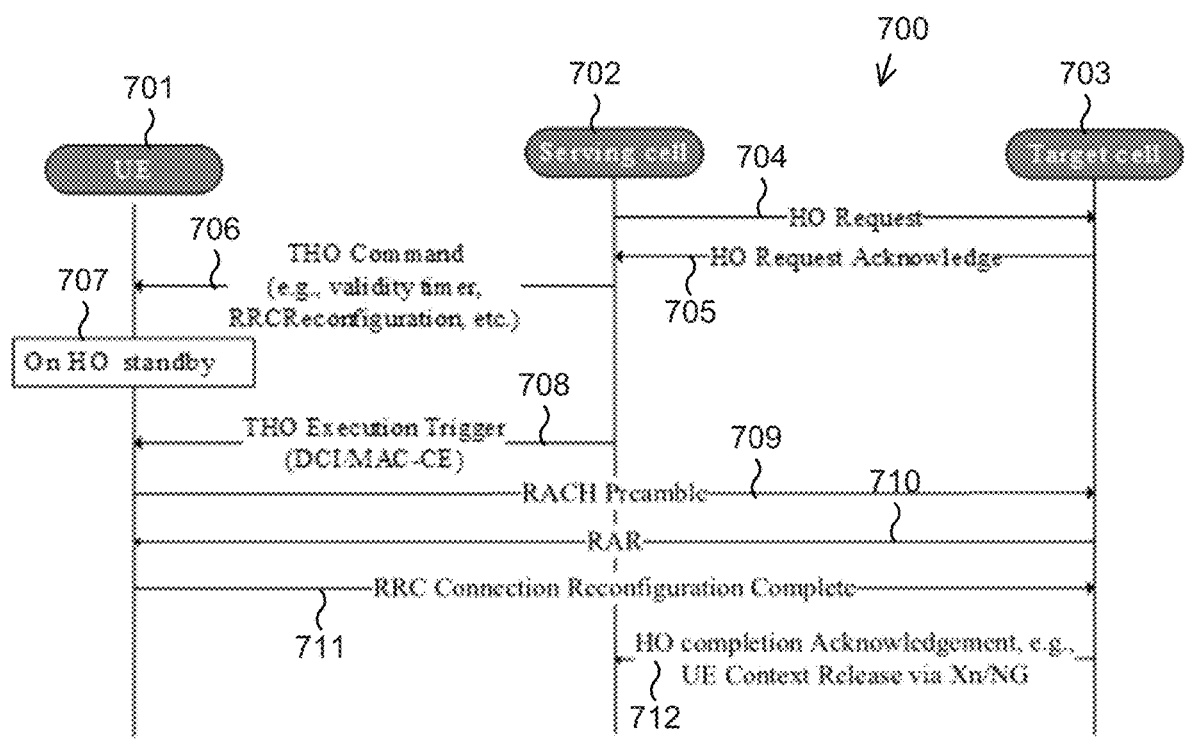
FIG. 7 illustrates an exemplary signal exchange for THO between a UE, a serving cell, and a target cell according to embodiments of the present disclosure.

FIG. 7 illustrates an exemplary signal exchange for THO between a UE, a serving cell, and a target cell according to embodiments of the present disclosure. The UE 701 may be any of UEs 111, 112, 113, 114, 115 or 116 in FIG. 1 and may have the structure of the electronic device 300 in FIG. 3. Serving cell 702 may be one of BSs 101, 102 or 103 in FIG. 1 and may have the structure of BS 200 illustrated in FIG. 2. Target cell 703 may be another of BSs 101, 102 or 103 in FIG. 1 and may also have the structure of BS 200 illustrated in FIG. 2. The embodiment of FIG. 7 is for illustration only. Other embodiments of the process 400 could be used without departing from the scope of this disclosure.

FIG. 7 depicts the concept of THO through signal exchanges between UE 701, serving cell 702, and target cell 703. In THO, the serving cell 702 can send HO request 704 to a target cell 703, e.g., based on the prediction on the future need of performing HO based on the location and/or trajectory of TRPs and/or UEs, including UE 701. When sending the HO request 704, the serving cell 702 can optionally inform the target cell 703 that the requested HO is THO type. The scheduling information by which the THO will be actually triggered can be included in the HO request 704 along with other information to prepare the handover at the target side.

After receiving HO Request Acknowledgement 705 from target cell 703, the serving cell 702 sends THO Command 706 to UE 701 including but not limited to validity timer, abort condition, and RRC reconfiguration message. The validity timer indicates until when the UE 701 awaits the triggering message to actually execute the HO. Upon expiration of the validity timer 707, the previously received THO Command 706 becomes no longer valid. The serving cell 702 can configure the validity timer value based on the prediction on when the HO needs to be performed using information including but not limited to the location and/or trajectory of TRPs and/or UEs, including UE 701. A default timer value can be assumed by UE 701 if the timer 707 is not explicitly configured. One example of default value can be infinity. For the situation when multiple UEs need to perform HO at the same time, the serving cell 702 can distribute the load of sending HO command(s) in time by sending the THO Commands to UEs with a time gap.

After receiving THO Command 706, the UE 701 holds the execution of HO until the reception of triggering message 708. When the UE 701 receives the THO execution trigger 708 from the serving cell 702, the UE 701 executes HO using the previously received RRC reconfiguration message as a part of THO Command 706. Along with sending the execution trigger 708 to the UE 701, the serving cell 702 may send the packet data convergence protocol (PDCP) sequence number (SN) STATUS TRANSFER message to the target cell 703 to convey the uplink PDCP SN receiver status and the downlink PDCP SN transmitter status. As described for SHO, various abort conditions can be configured to the UE 701 as well. If an abort event occurs while the UE 701 is monitoring for the triggering message, the UE 701 can stop monitoring for the triggering message and can report to the serving cell 702 on the occurrence of such abort event.

In one embodiment, the serving cell 702 can send HO cancelation message (not shown) to the previously sent THO Command 706. When more than one THO Command is (or has been) sent to the UE 701, the serving cell 702 can indicate a specific THO Command ID in the cancelation message.

If no abort event occurs and the UE 701 receives the triggering message 708 successfully, the UE 701 executes HO according to the RRC reconfiguration message contained in the THO Command 706, which includes PRACH transmission 709, RAR reception 710, RRC Connection Reconfiguration Complete transmission 711, and HO completion acknowledgement 712 as in the conventional HO.

Figure 8:
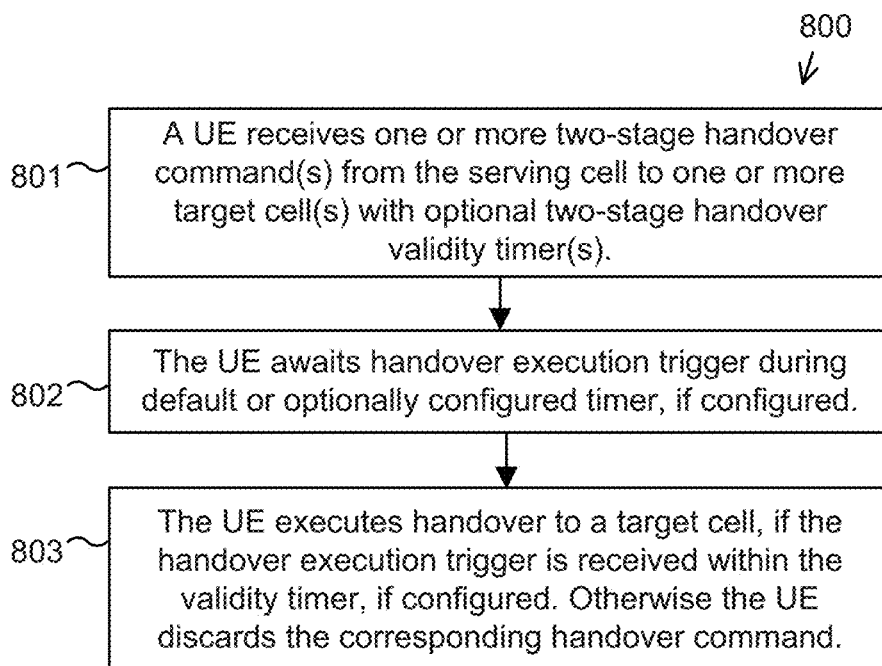
FIG. 8 illustrates a high level flowchart from a UE perspective illustrating THO according to various embodiments of this disclosure.

FIG. 8 illustrates a high level flowchart from a UE perspective illustrating THO according to various embodiments of this disclosure. The embodiment of FIG. 8 is for illustration only. Other embodiments of the process 800 could be used without departing from the scope of this disclosure.

tory of TRPs and/or UEs. At operation 802, the UE monitors the reception of the triggering message during the configured validity timer. The UE may also monitor the occurrence of abort condition(s), if configured. If no abort event occurs and the triggering message is received, the UE executes HO at operation 803.

Figure 9:
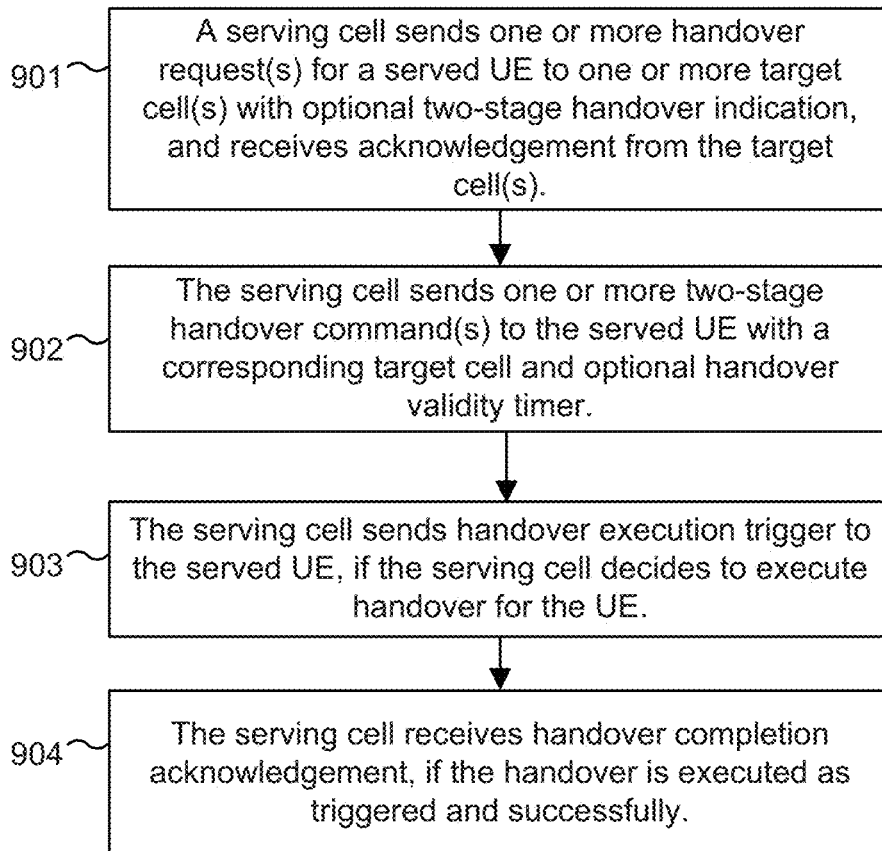
FIG. 9 illustrates a high level flowchart from a BS perspective illustrating THO according to various embodiments of this disclosure.

FIG. 9 illustrates a high level flowchart from a BS perspective illustrating THO according to various embodiments of this disclosure. The embodiment of FIG. 9 is for illustration only. Other embodiments of the process 900 could be used without departing from the scope of this disclosure.

FIG. 9 illustrates BS performance of THO as depicted in FIG. 7. In the process 900, the serving cell sends HO request to a target cell for a particular UE to perform HO at operation 901. When sending the HO request, the serving cell can optionally inform the target cell that the requested HO is THO type along with the approximate timing information on when the HO will be triggered. As described for the method 500 and the method 600, when the serving cell intends to send more than one THO Command to UE, the serving cell needs to send more than one HO requests to the corresponding target cell(s). After receiving an HO Request Acknowledgement from target cell, the serving cell confirms the target cell to be indicated to UE in the HO Command. At operation 902, the serving cell sends one or more THO Commands to UE with optional configuration on the validity timer and abort condition(s). At operation 903, the serving cell sends triggering message to command the UE to execute HO. When more than one THO is configured to UE, the triggering message can indicate the THO Command ID. Alternatively, certain implicit rule(s) can be defined on the triggered THO Command ID. Examples of such rules can include, but are not limited to, executing HO for the earliest or latest received THO Command or the THO Command having the longest or shortest remaining validity timer. When THO is successfully executed, at operation 904, the serving cell receives HO completion acknowledgement, such as UE Context Release message, from the target cell.

An exemplary THO RRC message design (e.g., a TriggeredReconfigToAddModList information element) is presented in ASN.1 below:

```
-- ASN1START
-- TAG-TRIGGEREDRECONFIGTOADDMODLIST-START
TriggeredReconfigToAddModList ::= SEQUENCE (SIZE (1..
   maxNrofSchedCells)) OF TriggeredReconfigToAddMod
TriggeredReconfigToAddMod ::=        SEQUENCE {
   TriggeredReconfigId               TriggeredReconfigId,
   validityTimer                     ENUMERATED {ms_A, ms_B, ms_C, ...}
      OPTIONAL,    -- Cond triggeredReconfigAdd
   abortCond                         SEQUENCE (SIZE (1..N)) OF
      EventId                           OPTIONAL,    -- Cond
      triggeredReconfigAdd
   triggeredRRCReconfig              OCTET STRING (CONTAINING
      RRCReconfiguration)                OPTIONAL,    -- Cond
      triggeredReconfigAdd
   ...
}
-- TAG-TRIGGEREDRECONFIGTOADDMODLIST-STOP
-- ASN1STOP
```

FIG. 8 illustrates UE performance of THO as depicted in FIG. 7. In the process 800, the UE a receives THO Command from serving cell at operation 801. As previously described, THO Command can include a validity timer, abort condition(s), and an RRC reconfiguration message. The serving cell can configure a series of THOs to a sequence of target cells based on the location and/or trajec- TriggeredReconfigToAddModList field descriptions:
validityTimer: Indicates the timer value until the received triggered handover command is valid. The value ms_N corresponds to N milliseconds. [Note: the message can be designed to be in the units of seconds or minutes.]
TriggeredRRCReconfig: The RRCReconfiguration message to be applied when the scheduled handover is executed. The RRCReconfiguration message contained in trig geredRRCReconfig cannot contain the field trig geredReconfiguration.

With the example RRC message to configure THO to UE, as described earlier, the UE can be configured with: a timer value on when to execute HO, denoted by validityTimer; HO abort conditions, denoted by abortCond; and the RRC Reconfiguration message for the HO execution indicated by trig geredRRCReconfig. In the above example, validityTimer is expressed in the unit of milliseconds (ms). In the actual message design, the unit can be arbitrary, e.g., seconds or minutes, etc. The abortCond is the same with SHO case. When the serving cell sends HO cancelation message, the cancelation message can include TriggeredReconfigId as the THO Command ID.

An example group triggering message design is presented below:

| DCI format X - HO-RNTI | | |
|---|---|---|
| Field Name | Length (Bits) | Comment |
| HO command number 1 | 1 | |
| HO command number 2 | 1 | |
| HO command number 3 | 1 | |
| ... | | |
| HO command number N | 1 | The size of N can be matched with a certain DCI format Y for the system BW |

The UE executes HO only after receiving the triggering message from the serving cell under THO. The triggering message can be delivered to the UE via, e.g., UE-specific DCI, group-specific DCI, media access control (MAC) control element (CE), etc. For the case of UE-specific DCI, the DCI message can include THO ID, if more than one THO is configured to the UE. The above example illustrates an exemplary format of group-specific DCI. For the case of group-specific DCI, multiple UEs can be assigned a common group radio network temporary identifier (RNTI) and the bit position to retrieve the triggering message from the group signaling can be assigned to UE. As another example, the UE identifier (ID) can be explicitly indicated in the DCI. The UE ID can be defined among the group of UEs sharing the same RNTI, expressed as an integer value. The group-specific DCI can also include THO ID for the case when more than one THO can be configured to UE. MAC CE signaling can be designed similarly as described for UE-specific and group-specific DCI. The group-cast multi-cast RNTI can be used as HO group RNTI in another embodiment.

In the CHO/SHO/THO, UEs are configured with UE-specific RRC reconfiguration messages as handover commands. The RRC reconfiguration messages can largely overlap between UEs on cell-specific configurations. Mobility configuration information, for instance, can be common to many UEs. In one embodiment, there is a group-specific RRC reconfiguration message which includes common parts of RRC reconfiguration to a group of UEs. In another embodiment, there is a residual UE-specific RRC reconfiguration message, which contains UE-specific RRC reconfigurations not included in the group-specific reconfiguration message.

In another embodiment, when a group of UEs switches cells, the network can reconfigure the group of UEs via system information update rather than UE-specific RRC reconfiguration. In this case, the paging for the target cell can include a system information (SI) update flag.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A serving cell, comprising:
a processor configured to generate a radio resource control (RRC) reconfiguration message including information indicating handover execution conditions and handover cancelation conditions for conditional handover (CHO) of service for a user equipment (UE) from the serving cell to a target cell, wherein:
a first of the handover execution conditions is based on whether a distance between the UE and a reference location is less than a threshold value,
a second of the handover execution conditions is based on whether a time elapsed from when the UE received the RRC reconfiguration message is greater than a threshold value, and
a first of the handover cancelation conditions is based on whether a distance between the UE and the reference location is greater than a threshold value; and
a transceiver operably coupled to the processor, the transceiver configured to:
transmit, to the UE, the RRC reconfiguration message, and
receive a handover completion acknowledgement based on completion of the CHO from the serving cell to the target cell.

2. The serving cell of claim 1, wherein a second of the handover cancelation conditions is based on whether a time elapsed from when the UE received the RRC reconfiguration message is greater than a threshold value.

3. The serving cell of claim 1, wherein:
the RRC reconfiguration message further includes information indicating a handover timer associated with a third of the handover execution conditions,
in case the handover timer is a scheduled handover timer for a scheduled handover to be performed for the UE upon expiration of the scheduled handover timer, the third handover execution condition comprises one or more abort conditions for aborting the scheduled handover, and
in case the handover timer is a handover validity timer for a predicted handover to be performed based on receipt at the UE of a handover triggering message, the third handover execution condition comprises receipt of the handover triggering message prior to expiration of the handover validity timer.

4. The serving cell of claim 3, wherein, in case the handover timer is a handover validity timer:
the third handover execution condition further comprises the one or more abort conditions for aborting the predicted handover, and
the handover triggering message includes an index of the handover timer among one or more configured handover timers.

5. The serving cell of claim 3, wherein the serving cell configures the handover validity timer based on one or more of a location of the UE, a location of a transmission reception point (TRP), a trajectory of the UE, or a trajectory of the TRP.

6. The serving cell of claim 3, wherein:
in case the handover timer is a handover validity timer, the transceiver is further configured to transmit a group triggering message to one or multiple UEs, and
wherein the group triggering message is scrambled with radio network temporary identifier (RNTI) known for a group of UEs and the group triggering message includes one or more of UE identifications triggered for handover among the UEs in the group of UEs.

7. The serving cell of claim 3, wherein the one or more abort conditions comprise at least one of:
a radio resource management (RRM) event, and
a location of the UE.

8. The serving cell of claim 7, wherein the RRM event comprises at least one of:
a measurement for the serving cell being better than a first threshold value upon expiration of the scheduled handover timer,
a measurement for a third cell being better, upon expiration of the scheduled handover timer, than one or more of the measurement for the serving cell, a measurement for the target cell, or a second threshold value, and
the measurement for the target cell being less than a third threshold value upon expiration of the scheduled handover timer.

9. The serving cell of claim 7, wherein the location of the UE comprises a location-based abort condition comprising a measurement of UE location deviation from a location at which the UE was activated with the handover timer.

10. A user equipment (UE), comprising:
a transceiver configured to receive a radio resource control (RRC) reconfiguration message including information indicating handover execution conditions and handover cancelation conditions for conditional handover (CHO) of service for a user equipment (UE) from a serving cell to a target cell, wherein:
a first of the handover execution conditions is based on whether a distance between the UE and a reference location is less than a threshold value,
a second of the handover execution conditions is based on whether a time elapsed from when the UE received the RRC reconfiguration message is greater than a threshold value, and
a first of the handover cancelation conditions is based on whether a distance between the UE and the reference location is greater than a threshold value; and
a processor operably coupled to the transceiver, the processor configured to determine whether to initiate the CHO based on the handover execution conditions and the handover cancelation conditions,
wherein the transceiver is configured to transmit a handover completion acknowledgement based on completion of the CHO from the serving cell to the target cell.

11. The UE of claim 10, wherein a second of the handover cancelation conditions is based on whether a time elapsed from when the UE received the RRC reconfiguration message is greater than a threshold value.

12. The UE of claim 10, wherein:
the RRC reconfiguration message further includes information indicating a handover timer associated with a third of the handover execution conditions,
in case the handover timer is a scheduled handover timer for a scheduled handover to be performed for the UE upon expiration of the scheduled handover timer, the third handover execution condition comprises one or more abort conditions for aborting the scheduled handover, and
in case the handover timer is a handover validity timer for a predicted handover to be performed based on receipt at the UE of a handover triggering message, the third handover execution condition comprises receipt of the handover triggering message prior to expiration of the handover validity timer.

13. The UE of claim 12, wherein the one or more abort conditions comprise at least one of:
a radio resource management (RRM) event, and
a location of the UE.

14. The UE of claim 13, wherein the RRM event comprises at least one of:
a measurement for the serving cell being better than a first threshold value upon expiration of the scheduled handover timer,
a measurement for a third cell being better, upon expiration of the scheduled handover timer, than one or more of the measurement for the serving cell, a measurement for the target cell, or a second threshold value, and
the measurement for the target cell being less than a third threshold value upon expiration of the scheduled handover timer.

15. The UE of claim 13, wherein the location of the UE comprises a location-based abort condition comprising a measurement of UE location deviation from a location at which the UE was activated with the handover timer.

16. A method for operating a user equipment (UE), the method comprising:
receiving a radio resource control (RRC) reconfiguration message including information indicating handover execution conditions and handover cancelation conditions for conditional handover (CHO) of service for a user equipment (UE) from a serving cell to a target cell, wherein:
a first of the handover execution conditions is based on whether a distance between the UE and a reference location is less than a threshold value,
a second of the handover execution conditions is based on whether a time elapsed from when the UE received the RRC reconfiguration message is greater than a threshold value, and
a first of the handover cancelation conditions is based on whether a distance between the UE and the reference location is greater than a threshold value;
determining whether to initiate the CHO based on the handover execution conditions and the handover cancelation conditions; and
transmitting a handover completion acknowledgement based on completion of the CHO from the serving cell to the target cell.

17. The method of claim 16, wherein a second of the handover cancelation conditions is based on whether a time elapsed from when the UE received the RRC reconfiguration message is greater than a threshold value.

18. The method of claim 16, wherein:
the RRC reconfiguration message further includes information indicating a handover timer associated with a third of the handover execution conditions;
in case the handover timer is a scheduled handover timer for a scheduled handover to be performed for the UE upon expiration of the scheduled handover timer, the third handover execution condition comprises one or more abort conditions for aborting the scheduled handover, and in case the handover timer is a handover validity timer for a predicted handover to be performed based on receipt at the UE of a handover triggering message, the third handover execution condition comprises receipt of the handover triggering message prior to expiration of the handover validity timer.

19. The method of claim 18, wherein the one or more abort conditions comprise at least one of:

a radio resource management (RRM) event, and a location of the UE.

20. The method of claim 19, wherein the RRM event comprises at least one of:

a measurement for the serving cell being better than a first threshold value upon expiration of the scheduled handover timer, a measurement for a third cell being better, upon expiration of the scheduled handover timer, than one or more of the measurement for the serving cell, a measurement for the target cell, or a second threshold value, and the measurement for the target cell being less than a third threshold value upon expiration of the scheduled handover timer.

* * * * *